United States Patent [19]

Martineau

[11] Patent Number: 5,032,289

[45] Date of Patent: Jul. 16, 1991

[54] IN SITU OFF-SHORE PROCESSING OF URBAN SEWAGE WITHOUT USING OR CONTAMINATING URBAN LAND

[76] Inventor: Andre P. Martineau, 30 William Fairfield Dr., Wenham, Mass. 01984

[21] Appl. No.: 231,426

[22] Filed: Aug. 12, 1988

[51] Int. Cl.$^5$ .............................................. B63B 38/00
[52] U.S. Cl. ..................................... 210/747; 114/264; 210/170; 210/175; 210/242.1; 210/751; 210/920
[58] Field of Search ............... 210/774, 747, 170, 175, 210/242.1, 609, 751, 919, 920, 921; 114/264, 267; 405/218, 219, 223

[56] References Cited

U.S. PATENT DOCUMENTS

| 1,150,077 | 8/1915 | Taft | 405/218 |
|---|---|---|---|
| 1,900,319 | 3/1933 | Vermeulen | 405/218 |
| 3,262,411 | 7/1966 | Kaltenecker | 114/0.5 |
| 3,630,365 | 12/1971 | Woodbridge | 210/152 |
| 3,788,476 | 1/1974 | Othmer | 210/194 |
| 4,142,819 | 3/1979 | Challine et al. | 405/218 |
| 4,422,929 | 12/1983 | Owens | 210/108 |
| 4,441,437 | 4/1984 | Moskau | 210/751 |
| 4,469,596 | 9/1984 | Kantor | 210/921 |
| 4,581,181 | 4/1986 | Nicholls | 210/242.1 |
| 4,618,421 | 10/1986 | Kantor | 210/920 |
| 4,692,249 | 9/1987 | Hammel | 210/242.1 |
| 4,818,405 | 4/1989 | Vroom et al. | 210/774 |
| 4,944,872 | 7/1990 | Kantor | 210/170 |

FOREIGN PATENT DOCUMENTS

| 59-26198 | 2/1984 | Japan | 210/609 |
|---|---|---|---|
| 59-123600 | 7/1984 | Japan | 210/609 |
| 62-294500 | 12/1987 | Japan | 210/609 |

OTHER PUBLICATIONS

Oil & Gas Journal, pp. 48 to 50, Feb. 24, 1986.
Oil & Gas Journal, p. 42, Mar. 30, 1987.
Oil & Gas Journal, p. 25, May 11, 1987.
Oil & Gas Journal, p. 66, Jan. 18, 1988.

Primary Examiner—Robert A. Dawson
Assistant Examiner—Joseph Drodge
Attorney, Agent, or Firm—Berman, Aisenberg & Platt

[57] ABSTRACT

An offshore sewage treatment facility or sludge facility is serviced on a ship. The ship is secured and in position by means of a single point mooring system which is attached to the vessel's stem or stern and is connected to a submerged pipeline as a conduit from the shore. This offshore facility is alternatively housed aboard a conventional offshore platform. The facility is totally and/or partially energy self sufficient by means of utilizing methane gas generated by the processing plant. The processing facility allows for primary and secondary waste water treatment and digestion, dehydration of sludge or solids, generation of methane gas, drying of sludge or solids and pelletization of sludge with end products or by-products of recyclable water for industrial and/or agricultural purposes, fertilizer after the dry sludge is mixed with potash, or the dry sludge may be manufactured into blocks suitable for the construction of buildings.

20 Claims, 1 Drawing Sheet

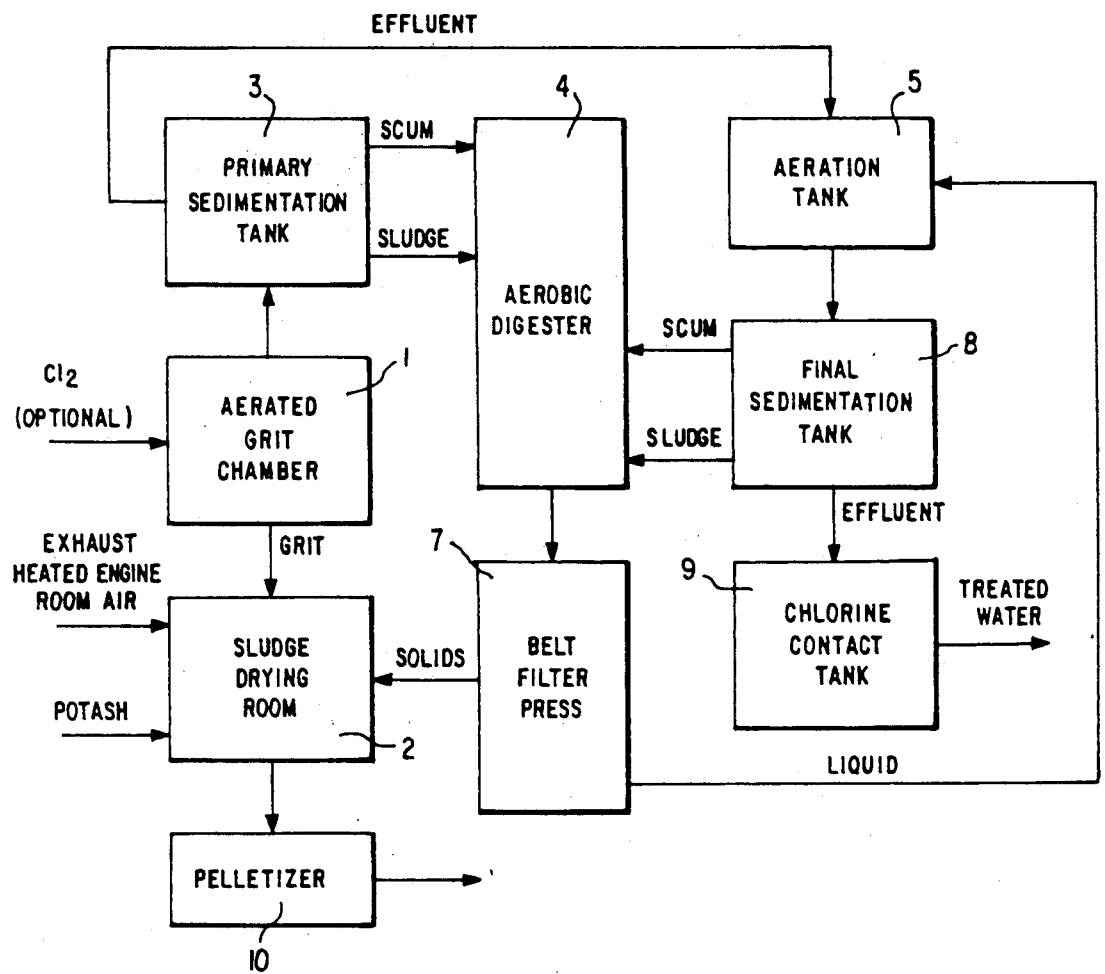

5,032,289

IN SITU OFF-SHORE PROCESSING OF URBAN SEWAGE WITHOUT USING OR CONTAMINATING URBAN LAND

FIELD OF INVENTION

An off-shore waste-water processing facility is provided for satisfying organic waste disposal needs of a sizable urban community.

BACKGROUND

Waste disposal in general and solid organic waste from large communities in particular present significant and ever-growing problems. Although effective waste-processing facilities are known and in operation in many communities, far more are needed to meet demands. Moreover, adequate land close to large cities is often unavailable or extremely costly. Residents in the area regularly object to nearby waste processing facilities, particularly those which are prone to generate malodors or otherwise impair the ambience of the area in which they are located.

As land becomes more and more scarce, the processing and/or dumping of solid waste presents increasingly difficult problems.

SUMMARY OF THE INVENTION

By placing a complete sewage processing facility offshore, the waste disposal needs of an adjacent community are completely satisfied without occupying valuable urban land or otherwise impairing the community. A sufficiently large vessel or platform is substantially permanently positioned at a sufficient distance offshore to avoid any impediment to the community it services. The technology for waste processing is completely known and well developed. Incorporating such technology in a sizable vessel or on a suitable platform is no more than a design problem which is readily within the skill of the art.

It is an object of this invention to provide a complete waste-water processing facility for a coastal community, particularly one on a bay, estuary, lake, harbor or other body of water which is predominantly calm. A further object is to provide a self-sufficient and self-contained waste-water processing facility which is preferably independent of shore-based power and thus unaffected by power outages ashore Another object is to provide a waste-water processing facility which neither occupies valuable land space nor creates an undesirable land-based environment.

A still further object is to provide a waste-water processing facility which can be replaced with state-of-the-art equipment and/or enlarged without incurring any down time, acquiring additional land or relocating. An additional object is to provide a waste-water processing facility which is sufficiently mobile and capable of transport to assist in organic waste disposal from a remote coastal community. Another object is to provide an offshore waste-water processing facility to convert organic waste to industrial quality water (suitable for agricultural and commercial needs) and useful solids. A still further object is to combine existing technology from waste-water treatment, oil and maritime industries to create a new industry and technology for processing organic waste. Other objects will be apparent from the description which follows.

The subject invention has a number of different aspects:

(a) a substantially stationary and permanent self-contained off-shore urban waste-water processing facility;

(b) a waste-water processing facility capable of converting organic waste from a community of in excess of 100,000 people (preferably one in excess of 150,000 people) to liquid and/or solid products which are useful or which satisfy EPA standards for disposal;

(c) a waste-water processing facility, which, preferably, floats on water and is capable of being moved to and/or from a substantially permanent location, such as a ship or barge;

(d) an off-shore waste-water processing facility which is preferably in combination with and moored to a dock or a single point mooring system;

(e) an off-shore waste-water processing facility in combination with a substantially permanently positioned platform supported, e.g., by concrete columns;

(f) an off-shore waste-water processing facility in combination with subsea conduit means for conveying waste water from an urban community to the facility;

(g) an off-shore waste-water processing facility which is capable of processing more than 100 million gallons per day of raw sewage;

(h) an off-shore waste-water processing facility which comprises a heat-producing power plant capable of satisfying all energy needs of the facility;

(i) an off-shore waste-water processing facility which has sludge drying means and which produces odoriferous gases;

(j) an off-shore waste-water processing facility which has a heat producing power plant and wherein heat from the power plant is used for drying sludge;

(k) an off-shore waste-water processing facility having a power plant which burns fuel admixed with air, and such air includes odoriferous gases produced by the waste-water processing facility; and (l) an off-shore waste-water processing facility wherein the power plant is one which burns fuel admixed with air, produced odoriferous gases and exhaust heat from sludge drying means.

DETAILS

A complete and self-contained waste-water treatment facility is housed in a suitable vessel (e.g. ship or barge) safely moored to a dock (if located inside a harbor, river, estuary or other body of water) or a single-point mooring system (if located offshore). The latter technique is often employed by the environmentally-sensitive petroleum industry.

Alternatively, the offshore waste-water processing facility is supported on a platform, e.g. one which is about 500 feet by 500 feet, on concrete pillars. Waste water or organic waste is preferably conveyed to the offshore processing facility by an underwater pipeline. Whether in a harbor, river, estuary or other body of water or ocean or whether in a vessel or on a platform, the facility is herein referred to as an offshore facility.

Care is preferably taken to position the offshore waste-water processing facility in water which is predominantly calm. Bays, estuaries and harbors ordinarily satisfy this requirement; other offshore locations may require construction of breakers or other means to create a calm environment for the offshore facility. With modern technology, however, such calm is not required; 20-foot seas and 100-knot winds can be coped with, but are not desirable.

An offshore waste-water processing facility relieves the burden of siting within a community. Municipalities are relieved of the expense of purchasing a right-of-way to construct treatment facilities. Since existing facilities are frequently located in developed areas, land cost is relatively high. In addition, there is frequently opposition to establishing or enlarging this type of facility near business or residential neighborhoods. Construction of land-based facilities often takes as long as ten years, whereas comparably-sized offshore facilities can be placed on line in a much shorter period of time. Also, the cost of operating even a modest conventional land-based waste-water processing plant is in the tens of millions of dollars (proportionately higher for larger facilities). The comparable operating cost for a very large offshore treatment plant (including allowance for periodic refurbishment) is below twenty million dollars per year.

Tank ships are preferred for the offshore waste-water treatment facility. New ships suitably sized and designed for a large treatment facility cost far less than their land-based counterparts. Conversion of existing vessels may amount to additional savings and is a further consideration.

Designing a new tank ship or redesigning an existing tank ship as a waste-water processing facility is well within the ordinary skill of the art. Available multi-level operation provides more than adequate space for servicing large populations and metropolitan areas. A floating treatment plant which processes up to 120 million gallons of raw sewage per day is capable of servicing a community (or a number of communities) of over one million people. The plant contains and burns off odors in addition to handling sludge. It is designed for permanent mooring offshore and attachment to a single-point mooring system. The plant preferably receives waste water via a subsea pipeline connected by the single-point mooring system; it is outfitted with both primary and secondary waste-water treatment equipment for handling sludge and producing waste-water effluent meeting EPA and state standards. The system is advantageously designed in 10 million gallon per day (gpd) modules and thus lends flexibility for constructing any size sea-based treatment plant to accommodate requirements of different communities.

Diverse waste-water processing facilities are currently in use, and the particular details of converting waste to disposable products is not the essence of this invention. The processing facility includes aerobic and/or anaerobic digestion. A flow diagram for an optional waste-water processing system is shown in the figure. According to this system initial screening (not shown) can be effected either onshore or on the offshore facility. The initially-screened material (with or without some preliminary chemical, e.g. chlorination, treatment) is passed through an aerated grit chamber 1 to remove grit, which is conveyed to a sludge drying room 2. Thus-treated waste water is then further separated in a primary sedimentation tank 3. Scum from the top and sludge from the bottom of the material in this tank is passed to an aerobic digester 4, whereas liquid effluent is subjected to aeration in aeration tank 5.

Digested material from the aerobic digester 4 is passed to a belt filter press 7, effluent from which is aerated in aeration tank 5. Dewatered solids from the belt filter press are mixed with potash and dried in the sludge drying room.

Effluent from aeration tank 5 is separated in a final sedimentation tank 8, from which scum and sludge are conducted into aerobic digester 4 and effluent is chlorinated in a chlorine contact tank 9, which yields commercially-useful treated water meeting EPA standards for disposal.

Dried sludge from sludge drying room 2 is pelletized in pelletizer 10 to produce material suitable for enhancing or enriching soil.

For energy efficiency (when the offshore facility is a ship) primary sedimentation tanks are advantageously installed on the top deck, aeration tanks on the middle deck and final sedimentation tanks on the lower deck so that gravity flow can be used to convey material between these several pieces of apparatus. Gravity flow is employed wherever convenient and cost effective.

For efficiency of operation, the waste-water processing facility has its own power plant. Heat from the power plant, e.g. engine room of a vessel, is transmitted to the sludge drying means to assist in that operation. Also, odoriferous gases produced in the waste-water processing facility are preferably combined with exhaust heat from the sludge drying means to provide intake air for the power plant. The odoriferous gases provide fuel, and the heated air reduces energy requirements. Burning the odoriferous gases also reduces pollution of the atmosphere.

The invention and its advantages are readily appreciated from the preceding description. Various changes may be made in the form, construction and arrangement of the waste-water processing facility and of its parts (including its support) without departing from the spirit and scope of the invention or sacrificing its material advantages. The described and illustrated systems are merely preferred embodiments.

What is claimed is:

1. A substantially stationary and substantially permanently positioned self-contained off-shore sewage processing facility constructed and arranged for converting organic waste to disposable products so as to satisfy waste disposal needs of a community of in excess of 100,000 people and which is substantially supported by a vessel or platform.

2. A sewage processing facility according to claim 1 which floats on water and is capable of being moved to a substantially permanent location.

3. A sewage processing facility according to claim 2 which is in the form of a ship or barge.

4. A sewage processing facility according to claim 3 in combination with and moored to a dock or a single point mooring system.

5. A sewage processing facility according to claim 1 in combination with a substantially permanently positioned platform on which it is supported.

6. A sewage processing facility according to claim 5 in which the platform is supported by concrete columns 7. A sewage processing facility according to claim 1 in combination with subsea conduit means for conveying sewage from the community to the facility.

8. A sewage processing facility according to claim 1 which is capable of processing more than 100 million gallons per day of raw sewage.

9. A sewage processing facility according to claim 1 which comprises (a) a power plant capable of satisfying all energy needs of the facility and producing heat and (b) sludge drying means which produce odoriferous gases; and wherein the sludge drying means comprises heat from the power plant.

10. A sewage processing facility according to claim 9 wherein the power plant is one which, burns fuel admixed with air, and the air includes the odoriferous gases.

11. A sewage processing facility according to claim 10 wherein the odoriferous gases and air are in combination with exhaust heat from the sludge drying means.

12. A sewage processing facility according to claim 1 wherein the disposable products comprise industrial quality water.

13. A sewage processing facility according to claim 1 wherein the disposable products comprise useful solids.

14. A sewage processing facility according to claim 1 wherein the disposable products satisfy EPA standards for disposal.

15. A sewage processing facility according to claim 1 which floats on water and is capable of being moved from a substantially permanent location.

16. A process of converting organic waste from a community of in excess of 100,000 people to disposable products in a substantially stationary and permanent off-shore sewage processing facility according to claim 1.

17. A process of converting organic waste from a community of in excess of 100,000 people to disposable products in a substantially stationary and permanent off-shore sewage processing facility according to claim 2.

18. A process of converting organic waste from a community of in excess of 100,000 people to disposable products in a substantially stationary and permanent off-shore sewage processing facility according to claim 3.

19. A process of converting organic waste from a community of in excess of 100,000 people to disposable products in a substantially stationary and permanent off-shore sewage processing facility according to claim 4.

20. A method of freeing valuable urban land, relieving a business or residential neighborhood of the burdens of a sewage treatment facility, and reducing the time for and cost of providing a sewage processing facility and of processing sewage for a coastal community of more than 100,000 people which comprises establishing and operating a sewage processing facility according to claim 1.

* * * * *